(12) United States Patent
Falkowski et al.

(10) Patent No.: US 7,439,220 B2
(45) Date of Patent: Oct. 21, 2008

(54) ANIONIC SOFTENERS AND METHODS FOR THE PRODUCTION THEREOF

(75) Inventors: Juergen Falkowski, Monheim (DE);
Christa Hartschen, Krefeld (DE);
Bernd Wahle, Kaarst (DE)

(73) Assignee: Cognis IP Management GmbH, Dusseldorf (DE)

( * ) Notice: Subject to any disclaimer, the term of this patent is extended or adjusted under 35 U.S.C. 154(b) by 395 days.

(21) Appl. No.: 11/276,774

(22) Filed: Mar. 14, 2006

(65) Prior Publication Data

US 2006/0207034 A1    Sep. 21, 2006

(30) Foreign Application Priority Data

Mar. 16, 2005    (DE) .................... 10 2005 012 479

(51) Int. Cl.
*C11D 1/37*    (2006.01)

(52) U.S. Cl. ........................................ 510/476; 510/489
(58) Field of Classification Search ................ 510/476, 510/489
See application file for complete search history.

(56) References Cited

U.S. PATENT DOCUMENTS 4,897,220 A * 1/1990 Trieselt et al. .............. 510/360
5,104,951 A * 4/1992 Seelmann-Eggebert et al. ........................ 526/240

FOREIGN PATENT DOCUMENTS

SU    1330130    * 8/1987

* cited by examiner

*Primary Examiner*—John R Hardee

(57) ABSTRACT

A dispersion including anionic softeners and a process for producing compositions of anionic softeners is provided and obtainable by (a) reacting partial glycerides with maleic anhydride at a temperature above 53° C., wherein maleic anhydride is used in stoichiometric or below stoichiometric quantities to form a reaction product; and, (b) reacting the reaction product with an aqueous solution of sodium sulphite, wherein a quantity of water is selected to form a final product in the form of a 5 to 50 wt % aqueous solution. Powder compositions of anionic softeners may be obtained by drying the final product.

20 Claims, No Drawings

ANIONIC SOFTENERS AND METHODS FOR THE PRODUCTION THEREOF

CROSS-REFERENCE TO RELATED APPLICATIONS

This application claims priority under 35 U.S.C. § 119 from German Patent Application No. 102005012479.8, filed on Mar. 16, 2005, the entire disclosure of which is hereby incorporated by reference.

FIELD OF THE INVENTION

This invention relates generally to textiles, and, more particularly, to anionic softeners and methods for the production thereof.

BACKGROUND INFORMATION

The total consumption of washing and cleaning agents in Europe is, at present, 4 million tons per year, of this, 0.65 to 0.7 million tons are consumed in Germany. Ten percent (10%) of the washing and cleaning agents come from the area of washing softeners which are commonly represented by cationic surfactants mainly from the group of quaternary dialkyl-ammonium esters (esterquats). However, cationic softeners frequently exhibit inadequate hydrophilic properties on textiles and prove unsuitable for finishing of cellulose fibers, as for example, in cotton underwear.

Up to now, anionic softeners have played only a subordinate role in the textile industry. The main reason for this—in comparison to the normally used cationic softeners—is the poor grip and the somewhat low adsorptive capacity. An advantage of the anionic softener, as compared to cationic surfactants, is a lower tendency to turn yellow because they do not contain any nitrogen-containing group in the molecule which, in combination with atmospheric oxygen, frequently leads to yellowing in textiles.

The increasing ecological demands present a special challenge for washing agents and softeners. It was already established in 1964 in the detergent law (German) that at least 80% of the surfactant used must be biodegradable. Likewise, in 1975, it was specified in the washing agent law that washing agents must not contain any environmental hazardous additives. These requirements are the basis for the redevelopment of laundry treatment agents. An effective environmental compatibility should be considered not only with regard to the end-products used but also in the manufacture of the products and the selection of the feedstock and intermediate products for the manufacture. Similarly, laundry softeners must be characterized by very good skin compatibility because they largely remain on the textile fiber and thus come in direct contact with the body.

Therefore, an aspect of the present invention is to make available textile softeners with hydrophilic properties, which lead to a low tendency of underwear to yellow, which have good adsorptive characteristics particularly on hydrophilic textile fibers, which meet the increasing environmental demands during manufacture and with regard to skin compatibility and biodegradability.

SUMMARY OF THE INVENTION

Briefly described, in one aspect of the invention, a dispersion including anionic softeners is obtainable by a process including (a) reacting partial glycerides with maleic anhydride at a temperature above 53° C., wherein maleic anhydride is used in stoichiometric or below stoichiometric quantities to form a reaction product; and, (b) reacting the reaction product with an aqueous solution of sodium sulphite, wherein a quantity of water is selected to form a final product in the form of a 5 to 50 wt % aqueous solution.

According to another aspect of the invention, a process for producing compositions of anionic softeners includes (a) reacting partial glycerides with maleic anhydride at a temperature above 53° C., wherein maleic anhydride is used in stoichiometric or below stoichiometric quantities to form a reaction product; and, (b) reacting the reaction product in an aqueous solution of sodium sulphite, wherein a quantity of water is selected to form a final product as an aqueous dispersion of anionic softeners in the form of a 5 to 50 wt % aqueous solution.

In another aspect of the invention, an aqueous dispersion of anionic softeners includes partial glycerides reacted with maleic anhydride at a temperature above 53° C., wherein maleic anhydride is used in stoichiometric or below stoichiometric quantities to form a reaction product which is subjected to sulphation by reacting with an aqueous solution of sodium sulphite, wherein the dispersion comprises a 5 to 50 wt % aqueous solution of anionic softeners.

DETAILED DESCRIPTION OF THE INVENTION

According to an aspect of the invention, a dispersion comprising anionic softeners is obtainable by a process comprising the steps of: (a) reacting partial glycerides with maleic anhydride at a temperature above 53° C., wherein maleic anhydride is used in stoichiometric or below stoichiometric quantities to form a reaction product; and, (b) sulphition of the reaction product of (a) by reacting the reaction product with an aqueous solution of sodium sulphite, wherein a quantity of water is selected to form a final product in the form of a 5 to 50 wt % aqueous solution. A powder composition comprising anionic softeners may be obtained by drying the final product of step (b). Step (a) may be conducted at a temperature above 70° C., and may range from about 70° C.-90° C. The quantity of water in step (b) may be selected to form a final product in the form of a 20 to 40 wt % aqueous solution.

According to another aspect of the invention, a process for producing compositions of anionic softeners includes the steps of: (a) reacting partial glycerides with maleic anhydride at a temperature above 53° C., wherein maleic anhydride is used in stoichiometric or below stoichiometric quantities to form a reaction product; and, (b) sulphition of the reaction product of (a) by reacting the reaction product in an aqueous solution of sodium sulphite, wherein a quantity of water is selected to form a final product of an aqueous dispersion of anionic softeners in the form of a 5 to 50 wt % aqueous solution. The process may further include the step of drying the aqueous dispersion into a powder composition. The compositions and powders may be incorporated into a textile.

In yet another aspect of the invention, an aqueous dispersion of anionic softeners includes partial glycerides reacted with maleic anhydride at a temperature above 53° C., wherein maleic anhydride is used in stoichiometric or below stoichiometric quantities to form a reaction product which is subjected to sulphation by reacting with an aqueous solution of sodium sulphite, wherein the dispersion comprises a 5 to 50 wt % aqueous solution of anionic softeners. The temperature above 53° C. may be from about 70° C.-90° C. The dispersion may also comprise a 20% to 40% solution, or a 27% to 33% solution. A powder composition comprising anionic softeners may be obtained by drying the aqueous dispersion. The dispersion or powder composition may be incorporated into a textile.

Anionic softeners exhibit good properties with regard to non-yellowing and hydrophilic character, but normally have insufficient effects with regard to soft hand for fabrics. Surprisingly it was now found that mixtures of long-chain glycerol fatty acid esters (partial glycerides), esterified with maleic anhydride and subsequent reaction with sodium sulphite into sulfosuccinates, exhibit very good soft hand properties on the cellulose fibers, together with good hydrophilicity and practically no tendency to yellowness. The compositions produced according to this method can be excellently used for the production of textiles having hydrophilic properties and also good soft fabric handle.

The partial glycerides used for the manufacture may be prepared, according to known technically and cost-favorable methods, directly by re-esterification from naturally occurring plant or animal fats. Moreover, these partial glycerides can be manufactured by direct esterification from glycerol or other polyols and the desired fatty acids. The fats and oils used for re-esterification preferably contain long-chain and saturated fatty acids having a number of carbon atoms from C 14 to C 24 whereby the range from C 16 to C 22 is preferred. The same applies to the fatty acids used in the direct esterification.

The partial glycerides thus produced preferably have a content of mono-glycerides from 45 wt % to 60 wt %, the range from 50 wt % to 55 wt % being particularly preferred. The content of di-glycerides is 20 wt % to 35 wt %. The remainder may be tri-glycerides and small amounts of free glycerol, wherein the quantity of glycerol is normally lower than 2 wt %.

In principle it is also possible to use higher-concentrated mono-glycerides which exhibit a content of monoglycerides greater than 90%. But the manufacture of these higher-concentrated mono-glycerides requires the application of an additional distillation step which makes the manufacture distinctively expensive and economically uninteresting in the field of softeners. Moreover, a residual content of tri- or di-glycerides of long-chain fatty acids, i.e., having chain lengths of 16 to 22 carbon atoms, can be totally advantageous for the soft hand of the product.

Because the partial glycerides used consist of a mixture of tri-, di-, and mono-glycerides, i.e., they also contain bivalent alcohols, monomeric and to a small extent also oligomeric precursors are formed which contain a different number of fatty acid residues on reaction with difunctional maleic anhydride. The subsequent reaction with sodium sulphite to the corresponding sulfosuccinates yields products which, in addition to the known properties, also give a good handle to the textile.

Not only the good suitability for hydrophilic and low yellowing finishing of textiles together with good textile handle, but also the positive ecological background are among the advantages of the products according to the present invention. The products can be manufactured from low cost raw materials and consist of up to almost 70% of derivatives of the renewable raw materials like animal and plant fats or oils. They do not contain any amine compounds which were frequently criticized in the past with regard to their ecological and dermatological properties.

In addition they are characterized by a very good skin compatibility because sulfosuccinates are regarded as particularly mild and skin-compatible substances in the cosmetic industry. Therefore the application to textiles which are worn or used near the body like towels or underwear is also safe.

The resulting end products can be directly used as 10 to 50% aqueous solution or their viscosity can be varied by other additives. In order to obtain better storage stability it is also possible to subject the solutions to a drying step—preferably spray drying, whereas other common drying methods are also considered. Before use, the powder may then be re-diluted with water or even added directly to the washing bath in powdery form. The application technological properties of the aqueous end product could also be changed by using additives of non-ionic softeners, like for example fatty acid ethoxylates, depending on the requirement.

Manufacture of Anionic Softener Dispersions

The production of partial glycerides may be carried out with technically known parameters for pressure, temperature and catalyst. For example, hardened tallow can be re-esterified with glycerol and sodium methylate as catalyst in the temperature range from 80° C. to 140° C., for a time period of 1-2 hours, to the corresponding partial glyceride. Other known re-esterification catalysts such as potassium and sodium hydroxide can also be used whereas temperatures up to 280° C. may be applied in order to reduce the reaction time.

The manufacture of partial glycerides by esterification can also be carried out with technically known parameters. For example, glycerol can be esterified with stearic acid and p-toluene sulfonic acid as catalyst in the temperature range from 120° C. to 180° C. whereas the resulting reaction water is removed by distillation in vacuum. Other known esterification catalysts such as sulphuric acid or tetrabutyl titanate can also be used whereas temperatures up to 260° C. can be used in order to reduce the reaction time.

The reaction of the partial glycerides with maleic anhydride takes place in a temperature range which is above the melting point of maleic anhydride at 53° C. Preferably this step is carried out at temperatures above 60° C., the temperature range from 70° C. to 90° C. is particularly preferred. Higher temperatures are generally not employed in the aqueous reaction system because the reaction mixture tends to frothing on approaching the boiling point of water.

The ratio of the reactants used should be selected in such a manner that the amount of the maleic anhydride used preferably reacts in toto, that is, the amount of maleic anhydride used is calculated in such a manner that theoretically only one of the two free OH-groups of the monoglycerides and the non-esterified OH-group of the diglycerides is reacted. Therefore, a method is preferred in which the theoretical amount of maleic anhydride is reacted to the respective half-esters as reactive intermediates. This method can also be denoted as sub-stoichiometric esterification because not all the theoretically reactive OH-groups are esterified with maleic anhydride.

It is also possible to use a smaller amount of maleic anhydride than that calculated according to the preferred method. The partial glycerides do not react completely with the amounts used, and a small amount of di- and mono-glycerides remains in the end-product, which have not reacted to form the respective semi-ester of maleic acid and accordingly do not form the sulfosuccinate during the subsequent sulphitation.

The properties of the reaction mixture with respect to hydrophilic character and tendency to yellowing are not affected by the residual quantities of partial glycerides. The textile handle or the emulsifiability and dilutability of the final product dispersion can even be modified using this method depending on the kind of application.

The last process step, the so-called sulphition, is carried out by reaction of the reaction product of the partial glycerides and the maleic anhydride with an aqueous solution of sodium sulphite whereas it has been proven advantageous to select the quantity of water in such a manner that the final product is available as a 20 to 50%, preferably 20 to 40% and particularly preferred as 27 to 33% solution.

In principle, higher dilutions are possible, but they are uneconomical due to the decreasing space-time yields in the reactor or the higher transportation and storage costs. Lower water contents lead to products with distinctly higher viscosity which are no longer stirrable or pumpable with a water content of from about 50%.

Residual contents of non-reacted sodium sulphite can be reacted to the corresponding sodium sulphate by addition of hydrogen peroxide.

For better storage or transportation, the aqueous dispersion end-product can be subsequently dried to form a powder composition, preferably by spray drying.

EXAMPLES 660 g of a mixture of partial glycerides (Cutina GMS of Cognis) is reacted for 3 hours at 85° C. with 138 g (1.41 mol) maleic anhydride in an electrically heated stirrer vessel equipped with a reflux condenser to yield the respective maleic acid ester. An acid number of 102.5 was measured after 3 hours corresponding to a reaction of maleic anhydride of 96%.

This reaction product was introduced into solution of 2317 g distilled water, 176 g sodium sulphite (1.39 mol) and 14 g sodium hydroxide solution (50%) and stirred for 2 hours at 75° C. The residual content of sodium sulphite was destroyed subsequently by addition of 8 g of hydrogen peroxide and the pH-value set to pH=6.5-7 by addition of diluted sodium hydroxide solution.

The final product had a viscosity of 180 mPas and an Epton value of 0.24 mval/g.

Several cotton terry cloth towels were finished with this product by pressure application on a foulard. For this a solution with 20 g/l of the reaction product (30%) was prepared and a squeezing pressure of 4 bar on the foulard was applied at a progressing speed of 3.0 m/min. The finished cotton terry cloth towels were dried in a tentering frame at different conditions.

The following degrees of whiteness were measured according to Berger.

TABLE 1

Softness grade according to Berger

| Drying conditions | GMS-Sulfosuccinate | Standard softener, cationic (Belsoft ® 44, Cognis) |
|---|---|---|
| 130° C./2 min | 149.01 | 143.3 |
| 130° C./2 min 150° C./3 min | 141.98 | 136.1 |
| 130° C./2 min 180° C./1 min | 136.84 | 130.8 |

A distinct improvement in the degree of whiteness is seen in the products finished with GMS-sulfosuccinate.

The textile handle was assessed by different test persons as being equal to that of the cotton terry cloth towels finished with conventional cationic softeners.

The rise in height of a water column was measured in order to assess the hydrophilic character. A rise in height of 0 mm was measured in the products finished with Belfasin 44®, i.e., these products produce a largely hydrophobic finishing. A rise in height of 20 mm was measured in the cotton terry cloth towels finished with GMS-sulfosuccinate, thus distinctly hydrophilic finishing was produced.

What is claimed is:

1. A dispersion comprising anionic softeners, obtainable by a process comprising the steps of:
   (a) reacting partial glycerides with maleic anhydride at a temperature above 53° C., wherein maleic anhydride is used in stoichiometric or below stoichiometric quantities to form a reaction product; and,
   (b) reacting the reaction product with an aqueous solution of sodium sulphite, wherein a quantity of water is selected to form a final product in the form of a 5 to 50 wt % aqueous solution.

2. The dispersion according to claim 1, wherein step (a) is conducted at a temperature above 70° C.

3. The dispersion of claim 2, wherein the quantity of water in step (b) is selected to form a final product in the form of a 20 to 40 wt % aqueous solution.

4. The dispersion according to claim 1, wherein step (a) is conducted at a temperature ranging from about 70° C.-90° C.

5. The dispersion of claim 1, wherein the quantity of water in step (b) is selected to form a final product in the form of a 20 to 40 wt % aqueous solution.

6. The dispersion according to claim 1, incorporated into a textile.

7. A powder composition comprising anionic softeners, obtained by the process according to claim 1 by drying the final product of step (b).

8. The composition according to claim 7, wherein step (a) is conducted at a temperature above 70° C.

9. The composition according to claim 7, wherein step (a) is conducted at a temperature ranging from about 70° C.-90° C.

10. The composition of claim 7, wherein the quantity of water in step (b) is selected to form a final product in the form of a 20 to 40 wt % aqueous solution.

11. The composition according to claim 7, incorporated into a textile.

12. A process for producing compositions of anionic softeners, comprising the steps of:
   (a) reacting partial glycerides with maleic anhydride at a temperature above 53° C., wherein maleic anhydride is used in stoichiometric or below stoichiometric quantities to form a reaction product; and,
   (b) reacting the reaction product in an aqueous solution of sodium sulphite, wherein a quantity of water is selected to form a final product of an aqueous dispersion of anionic softeners in the form of a 5 to 50 wt % aqueous solution.

13. The process according to claim 12, further comprising the step of drying the aqueous dispersion into a powder.

14. An aqueous dispersion of anionic softeners, comprising:
   partial glycerides reacted with maleic anhydride at a temperature above 53° C., wherein maleic anhydride is used in stoichiometric or below stoichiometric quantities to form a reaction product which is subjected to sulphation by reacting with an aqueous solution of sodium sulphite, wherein the dispersion comprises a 5 to 50 wt % aqueous solution of anionic softeners.

15. The dispersion according to claim 14, wherein the temperature above 53° C. is from about 70° C.-90° C.

16. The dispersion according to claim 14, wherein the dispersion comprises a 20% to 40% solution.

17. The dispersion according to claim 14, wherein the dispersion comprises a 27% to 33% solution.

18. The dispersion according to claim 14, incorporated into a textile.

19. A powder composition comprising anionic softeners, obtained by drying the dispersion of claim 14.

20. The powder composition according to claim 19, incorporated into a textile.

* * * * *